Sept. 1, 1959 W. F. KOSONOCKY 2,902,678

MAGNETIC SWITCHING SYSTEMS

Filed Aug. 31, 1956 2 Sheets-Sheet 1

INVENTOR.
WALTER F. KOSONOCKY
BY Morris L. Lakin [signature]
ATTORNEY

INVENTOR.
WALTER F KOSONOCKY
BY
Morris L. Rahkin
ATTORNEY

United States Patent Office 2,902,678
Patented Sept. 1, 1959

2,902,678

MAGNETIC SWITCHING SYSTEMS

Walter F. Kosonocky, Newark, N.J., assignor to Radio Corporation of America, a corporation of Delaware Application August 31, 1956, Serial No. 607,324

13 Claims. (Cl. 340—174)

This invention relates to magnetic systems, and particularly to magnetic systems capable of performing switching functions.

The present invention is an improvement over an invention disclosed in a copending application by Jan A. Rajchman entitled "Magnetic Systems," Serial No. 607,440, executed August 23, 1956, filed concurrently herewith. In the Rajchman invention, there is included an improved magnetic system which obtains the advantages of certain prior-art, combinatorial-type magnetic systems without requiring coincident excitations.

According to the Rajchman invention, a plurality of magnetic elements have respective output circuits connected in parallel with each other. Output signals are obtained selectively on the output of any desired element. A first output signal is generated in one output circuit of a selected element by driving the selected element to change its magnetic state. A second output signal is generated at some later time in the same, one output circuit by driving the remaining ones of the elements to change their magnetic states. The operation is carried out in three steps comprising, first, setting all of the elements, then driving the selected element to obtain the first output signal, and then resetting the remaining ones of the elements to obtain the second output signal.

It is an object of the present invention to provide an improved magnetic system of the type disclosed in the aforesaid Rajchman application but functionally simplified in that only two steps of operation are required.

Another object of the present invention is to provide an improved magnetic switching system which can be operated at a higher speed than the types heretofore known.

According to one form of the invention, the magnetic system includes a plurality of magnetic elements each having two remanent states of magnetization and a plurality of outputs each linked to a different element. The outputs of all the elements are connected in parallel with each other. A desired one of the elements is selected by applying an excitation to all the elements in a direction to change their magnetic states from an initial state to the other state, and concurrently applying another excitation to the selected element to maintain it in its initial state. A relatively large output of one polarity is produced on the output of the selected element. The one-polarity output is made up of the sum of the relatively small outputs produced by the non-selected elements as their states change from their initial to their other states. At some later time, another magnetizing force is applied to all the elements in a direction to return each to its initial state. At this later time, a relatively large, opposite-polarity output is produced on the output of the selected element which already is in its initial state. The opposite-polarity output is made up of the sum of the relatively small outputs produced by the non-selected elements in returning to their initial states.

The invention will be more fully understood from the following detailed description and the accompanying drawings wherein.

It may be noted that the present invention may be employed in various types of switching circuits known in the art. These known types include, for example, combinatorial-type switches such as coding and encoding circuits, distributing circuits, commutating circuits, etc.

Figure 1:
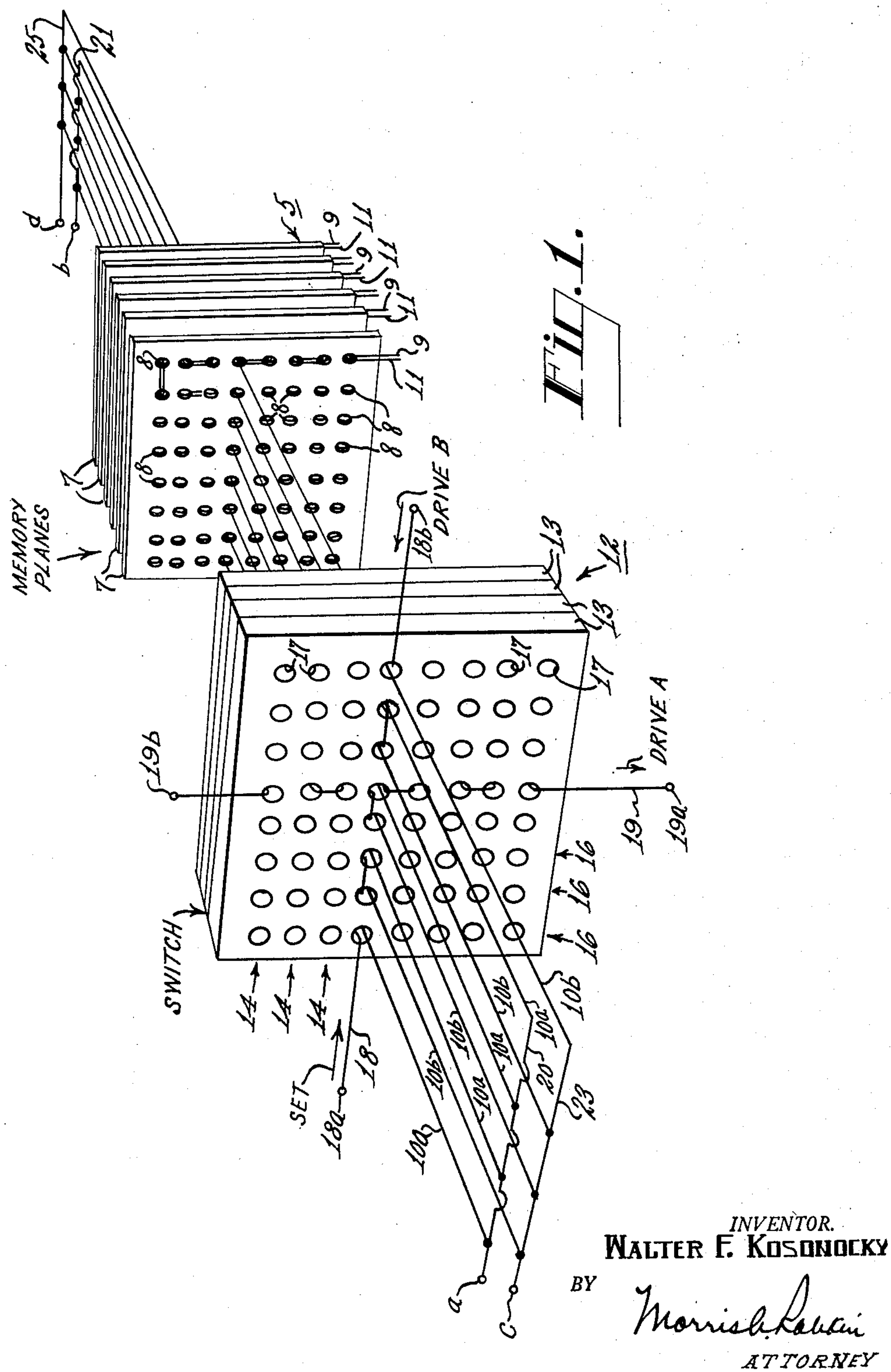
Fig. 1 is a schematic, perspective view of one embodiment of a switching system used in conjunction with a memory system.

An embodiment of the invention in conjunction with a memory system having an array 5 of two-dimensional memory planes 7 is shown in Fig. 1. Each memory plane 7 has, by way of example, an array of eight rows and eight columns of memory elements 8. The memory elements 8 of a plane 7 may be individual rectangular hysteresis loop cores embedded in a non-magnetic retaining medium. Copending application Serial No. 375,470, entitled "Memory System," and filed by J. A. Rajchman et al. on August 20, 1953, now Patent No. 2,784,391, issued March 5, 1957, describes such a memory plane construction. Alternatively, each of the memory planes 7 may be a plate of substantially rectangular hysteresis loop material having an array of apertures therein as shown. The material about each aperture then defines a different memory element 8.

The five memory planes 7 are stacked together in spaced relationship with corresponding elements 8 of each of the memory planes 7 aligned with each other. A different one of a plurality of access lines 10 is threaded through each group of five aligned elements 8. For convenience of drawing, only the set of access lines 10, coupled to one of the rows (the fourth row from the top) of elements 8 is shown; however, each of the other rows of elements 8 also may have a like set of access lines, not shown, linked thereto. Each of the memory planes 7 may have a sensing winding 9, partially indicated, and a separate inhibit winding 11, partially indicated, linking all of its memory elements 8. The access lines 10, and the sensing windings 9 are used for reading information out of a desired group of elements 8 of the array 5; while the access lines 10 and the inhibit windings 11 may be used for reading information into a desired group of the elements 8 of the array 5.

Signals ar applied to desired ones of the access lines 10 under the control of a magnetic switch 12. The switch 12 has four separate arrays 13 each having eight rows 14 and eight columns 16 of magnetic elements 17. Each switch element 17 is aligned with three other elements 17 of the array 12 and each group of aligned switch elements 17 is aligned with a different group of five memory elements 8 located in corresponding positions in the array 5. Each group of four switch elements 17 operates as a single unit and, hereafter, any statement referring to a switch element 17 is to be understood as including the other three elements 17 of the group aligned with that switch element 17. Each of the access lines 10 is threaded through a different one of the switch elements 17 and its aligned group of memory elements 8. Separate row excitation means, for example the row windings 18, and separate column excitation means, for example the column windings 19, are used to link each different row 14 and column 16 of the switch elements 17. Each switch element 17 has a different row winding 18 and a different column winding 19 linked thereto. For convenience of drawing, only one of the row windings 17 (the fourth from the top) and one of the column windings 19 (the fifth from the left) are shown.

Each of the arrays 13 of the switch elements 17 may consist of individual magnetic cores embedded in a non-magnetic retaining material. Alternatively, each array 13 may be an apertured plate of rectangular hysteresis loop magnetic material, as shown. In such case, the magnetic material about each aperture defines a different switch element 17. Four separate arrays 13 are shown for illustrative purposes. It is understood, however, that a single array having magnetic switch elements of increased volume may be used in place of the separate arrays 13.

The row and column windings 18 and 19 are linked to the elements 17 in known "checkerboard" fashion; that is, the sense of linkage of the excitation means alternately reverses in successive ones of the elements 17. The sensing and inhibit windings 9 and 11 of the memory planes 7 also may be linked to the memory elements 8 in similar "checkerboard" fashion. The "checkerboard" arrangement of the switch row and column windings 18 and 19, for example, provides an advantageous way of linking these windings to the switch elements 17. A "checkerboard" winding arrangement is described in Patent No. 2,691,154, issued to J. A. Rajchman on October 5, 1954, entitled "Magnetic Information Handling System." Also, other known forms of arranging a winding to link different groups of elements of an array of elements may be employed, if desired.

In the system of Fig. 1, alternate ones of the access lines 10 of a row are connected in parallel with each other in two separate groups. One of the groups includes the four access lines 10*a* which link odd-numbered (counting from the left) ones of the elements 17 of a row, and the other group includes the four access lines 10*b* which link the even-numbered elements 17 of the row. All the access lines 10*a* are connected in parallel with each other across first and second junction points *a*, *b*, at the shorting conductors 20 and 21, respectively located at the near side of the switch 12 and the far side of the memory array 5. Similarly, all the access lines 10*b* are connected in parallel with each other across two other junction points *c*, *d*, at the shorting conductors 23 and 25, respectively located at the near side of the switch 12 and the far side of the memory array 5. Each of the other rows of elements 17 of the switch 12 similarly have their access lines 10 connected in parallel with each other in two groups.

The arrangement of the system of Fig. 1 effectively provides two interlaced systems with half the switch elements 17 and their aligned memory cores 8 being part of one system, and the other half of the switch elements 17 and their aligned memory cores 8 being part of the other system. The row and column excitation means 18 and 19 of the switch 12 and the sensing and inhibit windings 9 and 11 of the memory array 5 are each common to both systems. In the system where "checkerboarding" is not used, the access lines 10 of a row 14 of switch elements 17 all may be connected in parallel with each other across only two junction points.

Figures 2, 3, 4, 5, 6, 7:
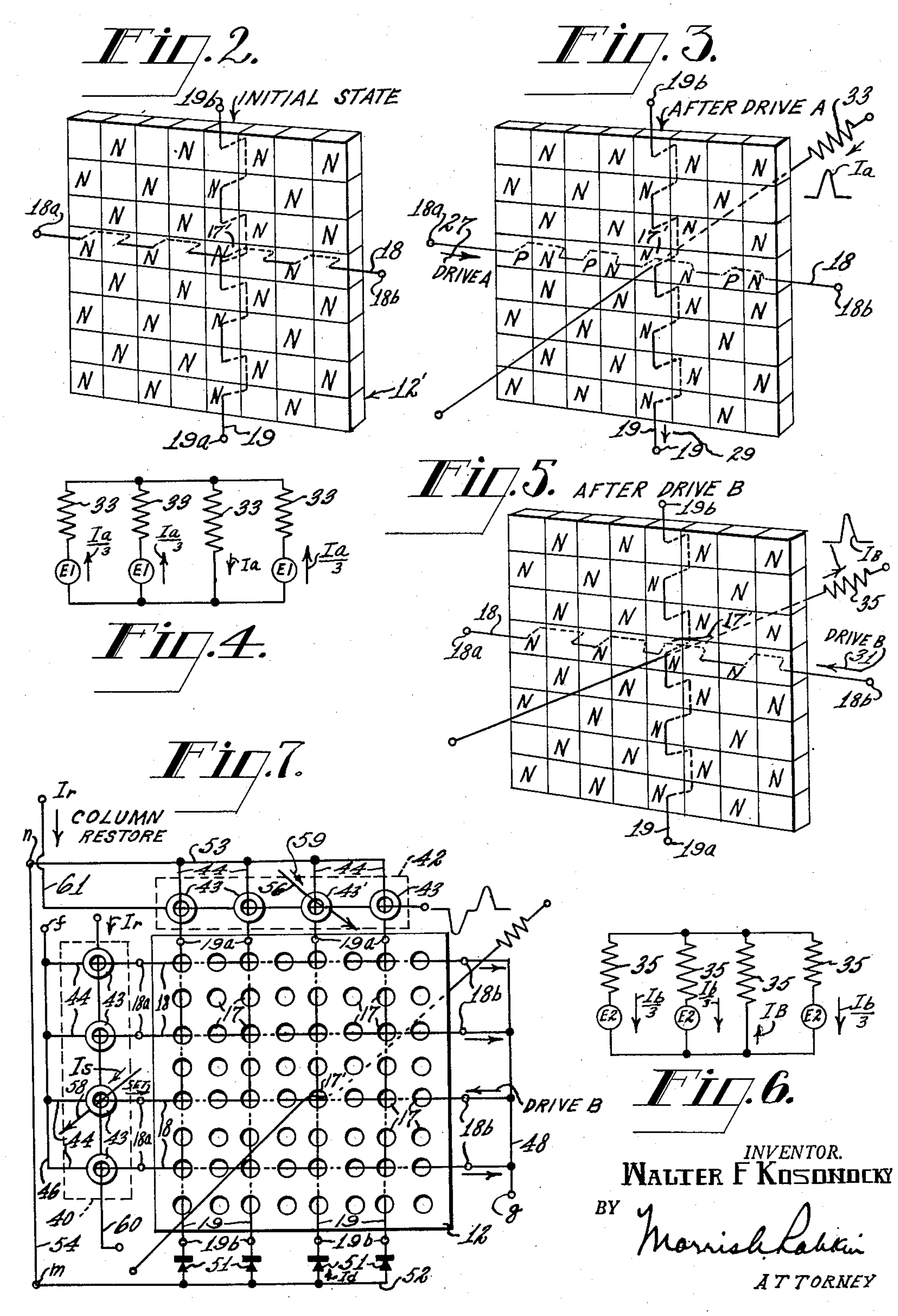
Figs. 2 and 3 are schematic diagrams each illustrating states of the elements of the system of Fig. 1 prior to and after one of two drive operations.
Fig. 4 is an equivalent circuit useful in explaining the operation of the system of Fig. 1 during one of the drive operations.
Fig. 5 is a schematic diagram illustrating the states of the elements of the system of Fig. 1 after another of the drive operations.
Fig. 6 is an equivalent circuit useful in explaining the operation of the system of Fig. 1 during the other drive operation.
Fig. 7 is a schematic diagram of another embodiment of the invention using a plurality of magnetic switches.

In operation, each of the elements 17 of the switch 12 is initially in one of the two remanent states, designated as the states N and P. Due to the "checkerboard" arrangement of the row and column windings 18 and 19, half of the elements 17 of a row 14 are initially in the state N and the other half are initially in the state P. Each of the elements 17 that is initially in the state N is illustrated in Fig. 2 by the letter "N" inscribed in the box located in a corresponding position in the array 12′. The unmarked boxes represent the elements 17 that are initially in the state P. The latter boxes are not marked "P" in the drawing in order to facilitate visualizing changed states of certain of the original "N" state elements 17, as shown in Figs. 3 and 5. Attention may be fixed on the row and column of elements 17 for which, in Fig. 2, the windings 18 and 19 are specifically shown.

The schedule for selecting a desired element 17 may be as follows: (1) applying a drive signal "A" to all the elements 17 of the row that includes the desired element, designated 17′ for convenience of description, in a direction to change each of the elements 17 of the row from its initial state to the opposite state, and concurrently applying an inhibit excitation to all the elements 17 of the column that includes the desired element 17′ in a direction to maintain the desired switch element 17′ in its initial state; and (2) applying a drive signal "B" to all the elements 17 of the row that includes the desired element in a direction to return each of the elements 17 to its initial state.

The state of the elements 17, after a drive signal "A" is applied to the row winding 18 and an inhibit signal is applied to the column winding 19, is indicated in the diagram of Fig. 3. The drive signal "A" current flowing in the row winding 18 is represented by the arrow 27 which indicates, as do the other current-representing arrows adjacent windings in the accompanying drawings, the direction of conventional current flow. The inhibit signal is represented by the arrow 29 adjacent the column winding 19. The inhibit signal preferably is initiated before the drive signal "A" so that any "noise" voltages induced in the access lines 10, due to the inhibit signal current, are substantially terminated before the initiation of the drive signal A. The inhibit signal current drives each of the elements 17 of the column further into saturation in its initial state and is made sufficiently large so that the drive signal "A" current is prevented from changing the initial state of the desired element 17′. The drive signal "A" current changes each of the remaining elements 17 of the row from its initial state to the opposite state. The four even-numbered (counting from left to right in the drawing) elements of this particular row are changed from the state P to the state N. Each of these elements produces a voltage of substantially the same amplitude and of the same polarity in its access line 10*b*. Consequently, substantially no current flows in any of the four parallel-connected access lines 10*b*. The three odd-numbered switch elements 17 other than the selected element 17′ of the row are changed from the state N to the state P by the drive signal "A" current, as indicated in Fig. 3. Each of these three switch elements 17 produces a relatively large voltage of like polarity in its access line 10*a* (Fig. 1). However, the desired element 17′ produces substantially no voltage in its access line 10*a* because it is held in its initial state N by the inhibit current.

Accordingly, as indicated in the diagram of Fig. 4, each of the three unselected odd-numbered elements 17 of the selected row operates as a voltage source generating a voltage "E1." For equal values of load impedances represented by resistance elements 33, each of the voltages E1 causes a current $$\frac{Ia}{3}$$

to flow through its coupled resistance element 33. The three branch currents $$\frac{Ia}{3}$$

combine and all flow through the fourth resistance element 33 to produce a net current I$a$. Each of the resistance elements 33 of Figs. 3 and 4 may represent, for example, a different group of aligned memory elements 8 of the array 5 of Fig. 1. The current I$a$ flowing in the access line 10$a$ of the desired switch element 17′ generates a magnetizing force in excess of the coercive force of each of the group of memory elements 8 receiving the current I$a$. Thus, each memory element 8 of the group may be changed from one state, say the state N, to the state P. After the current I$a$ is terminated, each of the memory elements 8 of the group is in the state P of remanence. However, each of the currents I$a$ in the other three access lines 10$a$ of the selected row generates a relatively small magnetizing force insufficient to change any of the memory elements 8 from the state P to the state N. After the currents I$a$ are terminated, each of the memory elements 8 receiving a current $$\frac{Ia}{3}$$

returns to its initial state of remanence.

In a system having "$n$" parallel branches, a current I$a$ flowing in the selected branch is approximately equal to $(n-1)$ times greater than any one of the currents in the other non-selected branches, assuming that the load devices 33 connected in the branches are approximately equal to each other. In an arrangement where the load devices 33 have different or variable impedances, separate, additional, current-limiting impedance elements may be connected in series with the respective load devices 33. The additional impedance elements may be, for example, resistance elements, or they may be current-sensitive elements whose impedance varies directly with applied voltage.

In a memory system, each of the load devices 33 may be made to exhibit similar and equal impedance characteristics by using a push-pull complementary arrangement of the memory planes, as described in the aforementioned Rajchman et al. Patent No. 2,784,391.

The information stored in the selected row of memory elements 8 may be ascertained during the drive "A" operation by observing the voltages induced in the separate sensing windings 9 of the memory planes 7. That is a memory element 8, whose state is changed by the current I$a$, induces a relatively large voltage in its sensing winding 9, while a memory element 8, whose state is not changed, induces a relatively small voltage in its sensing winding 9.

After a time "$t$," required to change the state of the group of memory elements 8, the drive "A" operation is terminated by removing the drive signal "A" current from the row winding 18 and by removing the inhibit current from the column winding 19.

The state of the switch elements 17, after the drive "B" operation, is indicated by the diagram of Fig. 5. The drive signal "B" current is represented by the arrow 31 adjacent the row winding 18. The drive signal "B" current is in a direction to change all of the elements 17 of the row to their initial states P and N. The three previously changed, odd-numbered elements 17 in the row are driven from the state P to their initial state N, and the desired element 17′ is driven from remanence in the state N further into saturation in the state N. Accordingly, a relatively large voltage is produced in the access line 10$a$ of each element changed to the state N, and relatively little voltage is produced in the access line 10$a$ of the desired element 17′. These induced voltages are of a polarity to cause a resulting current I$b$ to flow in the access lines 10$a$ of the desired element 17′. The current I$b$ flows in access line 10a in the opposite direction from the current I$a$. The current I$b$ is of sufficient amplitude to return each of the group of memory elements 8 (Fig. 1), receiving the current I$b$, to the state N. Information may be written into this group of memory elements 8 by applying, or not, an inhibit current to the inhibit windings 11 of the memory planes 7. The four switch elements 17 of the even-numbered columns of the row receiving the drive "B" current are changed from the state N back to the state P. Each of these elements 17 induces a voltage of substantially the same amplitude and polarity across the shorting conductors 23 and 25. Therefore, substantially no resultant current is induced in any of the access lines 10$b$.

The diagram of Fig. 6 exemplifies, in simple manner, the operation of the above-mentioned odd-numbered elements 17 of Fig. 5 when the drive "B" current is applied to the row winding 18. Each of the three changed elements 17 is replaced by a voltage source "E2." Each source E2 generates a current $$\frac{Ib}{3}$$

A different resistance element 35 is connected in series in each of the branch circuits. Each of the resistances 35 may be a different load device, for example a different group of memory elements 8 of Fig. 1, that are connected to one access line 10$a$. For equal load resistances 35, the currents $$\frac{Ib}{3}$$

are all equal to each other. The three currents $$\frac{Ib}{3}$$

combine in, and the resultant current I$b$ flows through, the fourth branch circuit which represents the access line 10$a$ of the desired switch element 17′. Each of the contributing currents $$\frac{Ib}{3}$$

is insufficient to change the state of any of the memory elements 8 receiving a current $$\frac{Ib}{3}$$

from its initial state. If desired, a separate current-limiting resistance element may be connected in each of the separate access lines 10$a$ and 10$b$ to limit each of the currents $$\frac{Ib}{3}$$

to some maximum amount.

After the time "$t$," required to change the states of the memory elements 8, the drive "B" operation is terminated by removing the drive signal "B" current from the row winding 18.

Another switch element 17 and its group of aligned memory elements 8 can be selected in a similar fashion by initiating another cycle of drive "A" and drive "B" operations to select the switch element 17 whose access line 10$a$ or 10$b$ is linked to the desired group of memory elements 8.

The excitation means for the switch 12 of Fig. 1 may be provided by any known means, such as the two further magnetic switches, as shown in the embodiment of Fig. 7. A first magnetic switch 40 may be used for applying the drive signals "A," and a second magnetic switch 42 may be used for supplying the drive signals "B." Each of the switches 40 and 42 may be arranged similarly to the magnetic switch shown in Fig. 1 of Patent No. 2,734,182, issued February 7, 1956, to J. A. Rajchman. For convenience of drawing, only half the switch cores 43 of the row and column switches 40 and 42 and their respective output windings 44 are shown, alternate switch cores of the row and column switches being omitted. The omitted row and column switch cores 43 are arranged in similar manner to those shown. Each of the switch cores 43 of the row and column switches 40 and 42 has an output winding 44. One terminal 44*a* of each of the output windings 44 of the row switch 40 is connected to the terminal 18*a* of a different one of the row windings 18. The other output terminals 44*b* of the output windings 44 of the row switch 40 are connected to a junction point "*f*" at a shorting conductor 46. The other terminal 18*b* of each row winding 18 is connected to a junction point *g* at a shorting conductor 48. Thus, all the series combinations of the output windings 44 of the row switch 40 and the row windings 18 of the switch 19 are connected in parallel with each other between the two junction points *f* and *g*.

Each of the output windings 44 of the column switch 42 has one terminal 44*a* connected to a terminal 19*a* of a different one of the column windings 19. The terminals 19*b* of the column windings 19 are each connected to one electrode, such as the cathode, of a different unilateral conducting device such as a diode rectifier element 51. The anodes of all the diodes 51 are connected to a junction point *m* at a shorting conductor 52. The other terminals of the output windings 44 of the column switch 42 are connected to a junction point *n* at a shorting conductor 53. The junction points *n* and *m* may be connected to each other by a conductor 54. The conductor 54 is used to provide a common return for certain currents produced during operation, as described hereinafter. Each of the switch elements 17 is linked by a different access line 10, as described in connection with the embodiment of Fig. 1.

A desired one of the cores 43 of the row switch 40 and a desired one of the cores 43 of the column switch 42 are each selected by applying signals to a set of selecting windings linked to the switch cores 43 in combinatorial fashion, as described in the aforementioned Rajchman Patent No. 2,734,182. The separate sets of selecting windings for the cores 43 of the row and column switches 40 and 42 are generally indicated in the drawing, for purposes of simplicity, by the single lines 56 and 58 linked to one of the cores 43′ of the row switch 40 and the column switch 42.

The operating schedule for the embodiment of Fig. 7 may be the same as described for that of the embodiment of Fig. 1. Assume that the desired switch element is the element 17′ located at the intersection of the fifth row (from the top) and the fifth column (from the left). Initially, one switch core 43′ of the column switch 42 is selected by applying signals to the selecting winding 56 linked to the desired column core 43′. The selecting signals are represented by the arrow 59 adjacent the selecting winding 56. The selecting currents drive the column core 43′, for example, from the state N to the state P. The flux change in the column core 43′ causes an inhibit current I*d* to flow in the coupled column winding 19. The current I*d* is in a direction to drive all the switch element 17 of the fifth column from remanence to saturation in their initial states. Each of the diodes 51, except the diode 51 of the fifth column of switch elements 17, is poled to block the current I*d* from flowing in its coupled column winding 19. Accordingly, the inhibit current I*d* flows from the upper terminal of the output winding 44 of the column switch core 43′ to the junction point *n*, then the current I*d* flows through the branch circuit 54 to the junction point *m*, and then the current I*d* flows through the diode 51 of the fifth column and the fifth column winding 19 to the lower terminal of the output winding 44 of the column switch core 43′. The connected diode elements 51 and the additional branch circuit 54 are provided to prevent the inhibit current I*d* from flowing in any of the paralleled column windings 17. It is undesirable to have portions of the inhibit current I*d* flowing in the remaining ones of the column windings 19 because the smaller portions are each in a direction to change the initial states of the remaining columns of the elements 17. Thus, if the hysteresis characteristics of the switch elements 17 are not substantially rectangular, then repeated applications of inhibit currents I*d* to the column windings 17 by the column switch 42 ultimately could produce a change in the initial states of one or more of the switch elements 17. However, if switch elements 17 having substantially rectangular hysteresis characteristics are used, then the portions of the inhibit current I*d* flowing in the column windings 19, during successive selections of desired switch elements 17, would all be less than the coercive force of the rectangular loop switch elements 17. Thus, the initial states of all non-selected ones of the switch elements 17 would be unchanged. In such case, the rectifier elements 51 and the additional branch circuit 54 are unnecessary and can be dispensed with. In practice, the rectifier elements 51 and the additional branch circuit 54 are preferred because they insure proper operation even though the hysteresis characteristics of the elements 13 deviate appreciably from the ideal rectangular loop materials. Thus, all that is required of the switch elements 17 is that they have appreciable remanence, and it is not necessary that they have a high "squareness ratio." By "squareness ratio" is meant the ratio between the remanent flux B*r* and the saturated flux *Bs*. Rectangular hysteresis loop materials may have "squareness ratios" in the order of 0.90 or greater.

The switch elements 17 of the inhibited column each has a relatively small flux change when it is driven from remanence to saturation in its initial state. The relatively small flux changes produce relatively small output currents in their coupled access lines 10. However, in a memory system these output currents are of insufficient magnitude to produce any appreciable flux change in the memory cores coupled thereto. Also, these "noise" signals, caused in the access lines 10 by the inhibit current I*d*, are of relatively short duration and substantially terminate after the inhibit current I*d* has reached a steady value. The relatively small voltages produced by the inhibited column of elements 17 also produce relatively small voltages in the coupled row windings 18. However, substantially no current is produced in any of the row windings 18 as a result of the inhibit current I*d* because substantially the same potential difference appears across each of the row windings 18 connected between the points *f* and *g*.

At some later time, after the inhibit current I*d* has reached a steady value, the row switch 40 is operated. A desired core 43′ of the row switch 40 is selected by applying another set of signals to the selecting windings 58. The desired row switch core 43′ is thereby driven, for example, from the state N to the state P. The flux change in the driven row switch core 43′ produces a drive signal "A" current in its output winding 44. The drive signal "A" current flows from one terminal of the output winding 44 of the row switch core 43′ and through the row winding 18 coupled to the desired switch element 17′ to the junction point *g*. The drive signal "A" current then divides into three portions and returns through the other three row windings 18 to the junction point *f*. The drive signal "A" current then flows from the junction point *f* to the other terminal of the output winding 44 of the row switch core 43′. Note that each of the portions of the drive signal "A" current in the non-selected rows of elements 17 is in a direction to change a switch element 17 receiving it from remanence to saturation in its initial state. The switch element 17′, located at the intersection of the activated row and column windings 18 and 19, and receiving the drive signal "A" current, is held in its initial state N due to the concurrent presence of the inhibit current I*d* in its column winding 19. The remaining switch elements 17 of the fifth row, however, are changed from their initial states to their other states by the drive signal "A" current. The three changed elements 17 of the row each produces an output current in its access line 10*a*. All the currents return, as the single output current I*a*, through the access line 10*a* of the desired element 17′, as described above for the system of Fig. 1. Substantially no output current is induced in the access lines 10b of any of the even-numbered switch elements 17 of the activated row for the reason described above in connection with Figs. 1 and 3. The output current I*a* is of sufficient amplitude to change each of the memory cores 8 (Fig. 1), linked by the access line 10a of the desired switch elements 17′, from one state to the other state. At this time, the information stored in this group of memory cores 8 may be ascertained by observing the voltages induced in the separate sensing windings 9 coupled to these memory cores 8.

The amplitude of the inhibit current I*d* is made sufficiently large such that the desired switch element 17′ is held in its initial state N despite the presence of both the drive signal "A" current and the output current I*a* both of which flow at this time in its row winding 18 and its access line 10a, respectively. The flux changes produced in the three changed switch elements 17, receiving the drive signal "A" current, produce separate "noise" currents in their coupled column windings 19. These "noise" currents each flow from the terminals 19a of the three column windings 19 and through the respective output windings 44 of the column switch 42 to the junction point *n*. The "noise" currents then return through the branch circuit 54, the junction point *m*, and the three diode elements 51 to the other terminals of the column windings 17. However, each of these "noise" currents is also in a direction to drive any switch element 17 receiving it from remanence to saturation in its initial state. A portion of each "noise" current may also return through the column winding 19 of the desired switch element 17′, but these portions do not appreciably affect the operation of the system.

Both the row and the column selecting signals may be terminated at the same time, or the column switch 42 selecting signals may be terminated after the row switch selecting signals. Upon the termination of the drive "A" operation, a restore current I*r* is applied to a row restore coil 60 linked to each of the cores 43 of the row switch 40. The restore current I*r* returns the previously driven row switch core 43′ to its initial state N. The flux change in the switch core 43′ induces a drive signal "B" current in its coupled row winding 18. The drive signal "B" current if of a polarity opposite the drive signal "A" current and flows into the terminal 18b of the row winding 18 of the desired switch element 17′. The drive signal "B" current is in a direction to return each of the switch elements 17 of the selected row to its initial state. Each of the odd-numbered switch elements 17 of the selected row is returned to the state N except the desired element 17′ which already is in the state N. The flux changes in odd-numbered switch elements 17 each induces an output current in its access line 10a. These output currents are additive, to produce the output current I*b*, in the access line 10a of the desired switch element 17′. The output current I*b*, generated during the drive "B" time, is of the opposite polarity from the output current I*a* and may be of the same amplitude. The output current I*b* is of sufficient amplitude to change each memory core 8 (Fig. 1) receiving it from the other to the one state. Information may be written into the group of memory cores 8, receiving the output current I*b*, by simultaneously applying, or not applying, an inhibit current to the separate inhibit windings 11 linked to the memory cores 8 of the group.

The drive signal "B" current flows from one terminal of the output winding 44 of the row switch core 43′ to the junction point *f*. Then the drive signal "B" current divides substantially evenly into equal portions and each portion flows through a different output winding 44 of the non-selected row switch cores 43, and then through the connected row windings 18 to the junction point *g*. Then the equal portions combine in the row winding 18 of the desired switch element 17′ and return to the other terminal of the output winding 44 of the selected row switch core 43′. The portions of the drive signal "B" current are each in a direction to change a row switch core 43 receiving it from remanence to saturation in its initial state. Also, the portions of the drive signal "B" current are of insufficient amplitude to change the initial state of any of the switch elements 17 receiving it.

After the information is written into the desired group of memory cores, the selected column switch core 43′ may be returned to its initial state N by applying a restore current I*r* to a restore winding 61 linking each of the cores 43 of the column switch 42. The flux change produced in the changed column core 43′ is prevented from producing any current flow in its column winding 19 due to the diode element 51 which is biased towards cut-off by the voltage induced in the output winding 44 of the driven column core 43′. Similarly, any voltages produced by any of the other cores 43 of the column switch 42, as a result of the restore current I*r*, do not produce any current flow in their coupled column windings 19 because these voltages are in a direction to bias the diode elements 51 towards cut-off.

Accordingly, by selectively operating the row and column switches 40 and 42 to select a desired one of the switch elements 17 of the switch 12, equal amplitude and opposite-polarity output currents can be delivered to a load device coupled to the output of the desired switch element 17.

There have been described herein improved magnetic switching systems using magnetic elements arranged in a system such that an output current may be derived on a desired output as a result of currents induced in others of the outputs.

The selecting currents of the systems of the invention may be substantially larger than those used in certain prior systems because the rectangular hysteresis characteristic of the material is not used in making the selection. Accordingly, relatively high operating speeds may be achieved by employing drive currents having relatively fast rise times and relatively large amplitudes. In the systems described herein, any suitable magnetic material having appreciable remanence may be used. For example, a magnetic material having a $Br/Bs$ ratio of, say, approximately 0.6 or greater, may be used. It is not necessary that the magnetic elements have rectangular hysteresis characteristics.

What is claimed is:

1. In a magnetic system, the combination of a plurality of magnetic elements each having two remanent states, a plurality of output windings each linked to a different one of said elements, and means connecting said windings in an output circuit, said output circuit including means providing a return path through the output winding of one of said elements for output currents induced in said output windings of others of said elements when said other elements are changed from one to the other and from the other to the one of said two states.

2. A magnetic system comprising a plurality of magnetic elements each having two remanent states of magnetization and each requiring a threshold excitation before changing from one to the other of said states, first and second excitation means each linking a different group of said elements, one of said elements being common to both said groups and others of said elements not common to both said groups, a separate output circuit for each element, means connecting the said output circuits of the elements of one of said groups in parallel with each other, and means for applying to both said groups concurrent excitations which exceed said threshold excitation and which are of opposite polarity.

3. A magnetic system comprising a plurality of magnetic elements each having two remanent states of magnetization, a plurality of output circuits each linking a different one of said elements, said output circuits of certain of said elements being connected in parallel with each other, a first excitation means linking all said certain elements, a second excitation means linking others of said elements and also one of said certain elements, and means for selecting said one certain element comprising means for applying a first excitation to said first excitation means to change said certain elements from one to the other of said two states, and means for concurrently applying a second excitation to said second excitation means to hold said one element in said one state.

4. A magnetic system comprising a plurality of magnetic elements each having two remanent states of magnetization and each requiring a threshold excitation before changing from one to the other of said two states, a plurality of output circuits each linking a different one of said elements and all said output circuits being connected in parallel with each other, and means for deriving an output signal on a desired one of said output circuits comprising means for applying to all said elements a first excitation sufficient to change said elements from said one to said other state, and means for concurrently applying to that one element linked by said desired output circuit and not others of said elements a second excitation to hold said one element in said one state, whereby said output signal on said one output circuit is derived from the changed ones of said elements.

5. In a magnetic system, the combination comprising a plurality of magnetic elements each having two remanent states of magnetization, a plurality of branch circuits each coupled to a different one of said elements, said branch circuits being connected in parallel with each other, means for applying to said elements an excitation in a direction to change said elements from one to the other of said states, and means for applying concurrently to one of said elements another excitation in a direction to hold it in said one state, said elements other than said one element producing a signal in the said branch circuit of said one element, and means for applying to all said elements a further excitation in a direction to change said elements from said other to said one state, said other elements producing another signal in the said branch circuit of said one element.

6. In a magnetic system, the combination of first and second pairs of magnetic elements, each of said elements having two remanent states, separate first excitation means each linking both elements in a different one of said pairs, separate second excitation means each linking a different element in each of said pairs, a separate output circuit for each said element, separate first and second parallel circuits, said first parallel circuit including said output circuits of said first pair of elements, said second parallel circuit including said output circuits of said second pair of elements, and means for selecting a desired one of said elements comprising means for applying to that one of said first excitation means linked to said pair of elements including said desired element a first excitation, and means for applying concurrently to that one of said second excitation means linked to said desired element another excitation.

7. A magnetic system comprising a plurality of magnetic elements each having two remanent states of magnetization and each requiring a threshold excitation before changing from one to the other of said states, each of said elements being magnetized in an initial one of said states, a plurality of first excitation means, each linking a different first group of said elements, a plurality of second excitation means, each linking a different second group of said elements, each said first group having a different element in common with each different one of said second groups of elements, a separate output circuit for each said element, all the said output circuits of the elements of each different first group being connected in parallel with each other, and means for applying concurrently to one of said first and one of said second excitation means separate excitations which exceed said threshold excitation and which are of opposite polarity.

8. In a magnetic switching system, the combination of a plurality of magnetic elements each having two remanent states of magnetization, a plurality of output windings, each of said output windings being linked to a different one of said elements, first and second junction points, all the output windings of said elements being connected in parallel with each other between said first and second junction points, a first winding means linked to each of said elements, a plurality of second winding means each linked to a different one of said elements, and means for selecting a desired one of said elements comprising means to apply concurrently one excitation to said first winding means and another excitation to that one of said second winding means linked to said desired element, whereby a relatively large output signal is produced in the output winding of said desired element, said relatively large output signal being made up of a plurality of relatively small output signals respectively produced in the said output windings of the remaining ones of said elements.

9. In a magnetic switching system, the combination of a plurality of magnetic elements each having two remanent states of magnetization, a plurality of output windings, each of said output windings being linked to a different one of said elements, first and second junction points, all of the output windings of said elements being connected in parallel with each other between said first and second junction points, a first winding means linked to each of said elements, a plurality of second winding means each linked to a different one of said elements, and means for selecting a desired one of said elements comprising means to apply concurrently one excitation to said first winding means and another excitation to that one of said second winding means linked to said desired element, and means to apply to said first winding means a further excitation, whereby one output signal is produced in the output winding of said desired element when said concurrent excitations are applied, and another output signal is produced in the output winding of said desired element when said further excitation is applied.

10. A magnetic system comprising a plurality of magnetic elements arranged in rows and columns, said elements each having two remanent states of magnetization, a plurality of first excitation means each linking the elements of a different row, a plurality of second excitation means each linking the elements of a different column, first and second magnetic switches each having a plurality of output windings and each having means for selecting a desired one of said output windings, a first pair of junction points, each of said first excitation means being connected in series with a different one of said first switch output windings between said first pair of junction points, a second pair of junction points, a plurality of unilateral conducting devices, each of said second excitation means being connected in series with a different one of said second switch output windings and a different one of said unilateral conducting devices between said second pair of junction points, a branch circuit connected between said second pair of junction points, and a plurality of output circuits each linking a different one of said elements, the said output circuits of the elements of any one of said rows being connected in parallel with each other.

11. In a magnetic switching system, the combination comprising a plate of magnetic material having therein a plurality of apertures, each of said apertures defining a different one of a plurality of magnetic elements each having two states of remanent magnetization, a plurality of output windings, each of said output windings being linked to a different one of said elements, first and second junction points, each of the output windings of certain ones of said elements being connected in parallel with one another between said first and second junction points, third and fourth junction points, each of the output windings of certain others of said elements being connected in parallel with one another between said third and fourth junction points, a plurality of first excitation means each linking alternately one element of a different first group of said certain elements and one element of a different group of said certain other elements, a plurality of second excitation means, certain of said second excitation means each linking different groups of said certain elements and the others of said excitation means each linking a different group of said certain other elements, and means for selecting a desired one of said elements comprising means to apply concurrent, opposite polarity excitations to one of said first excitation means linking said desired element and one of said second excitation means linking said desired element, one of said excitations being in a direction to drive all the elements receiving it from an initial to the other of their magnetic states, and the other of said excitations being in a direction to drive all the elements receiving it to saturation in their initial states.

12. In a magnetic switching system, the combination comprising a plate of magnetic material having therein a plurality of apertures arranged in rows and columns, the material about each different one of said apertures defining a different magnetic element each having two states of remament magnetization, a plurality of row windings each linked to all the elements in a different one of said rows and successive elements in a row being linked thereby in opposite senses, a plurality of column windings each linking all the elements in a different one of said columns and successive ones of said elements in a column being linked thereby in opposite senses, a plurality of output windings each linked to a different one of said elements, a plurality of first and second output circuits, each said first output circuit including the said output windings of alternate ones of said elements in a different one of said rows, and each said second output circuit including the said output windings of the remaining ones of said elements of a different one of said rows, and means for selecting a desired one of said elements comprising means for applying to said row winding linked to said desired element a first excitation to change said elements linked thereby from their initial to the other of said states, and means for applying concurrently to the column winding linked to said desired element a second excitation to hold said desired element in its initial state.

13. In a magnetic switching system, the combination comprising a plurality of plates of magnetic material each having therein a plurality of apertures arranged in rows and columns, said plates being stacked together with corresponding apertures therein being aligned with each other, each different group of said aligned apertures defining a different one of a plurality of magnetic elements, each said element having two remament states of magnetization, a plurality of row windings each linked to all the elements in a different one of said rows and successive elements in a row being linked thereby in opposite senses, a plurality of column windings each linking all the elements in a different one of said columns and successive ones of said elements in a column being linked thereby in opposite senses, a plurality of output windings each linked to a different one of said elements, a plurality of first and second output circuits, each said first output circuit including the said output windings of alternate ones of said elements of a different one of said rows, and each said second output circuit including the said output windings of the remaining ones of said elements of a different one of sad rows, and means for selecting a desired one of said elements comprising means for applying to said row winding linked to said desired element a first excitation to change said elements linked thereby from their initial to the other of said states, and means for applying concurrently a second excitation to the column winding linked to said desired element to hold said desired element in its initial state.

References Cited in the file of this patent

UNITED STATES PATENTS

| | | |
|---|---|---|
| 2,734,182 | Rajchman | Feb. 7, 1956 |
| 2,784,391 | Rajchman et al. | Mar. 5, 1957 |

OTHER REFERENCES

Publication I, "A Myriabit Magnetic-Core Matrix Memory" by J. A. Rajchman, published in "Proceedings of the I.R.E." Oct. 1953, pp. 1407–1421.

UNITED STATES PATENT OFFICE

CERTIFICATE OF CORRECTION

Patent No. 2,902,678 September 1, 1959

Walter F. Kosonocky

It is hereby certified that error appears in the printed specification of the above numbered patent requiring correction and that the said Letters Patent should read as corrected below.

Column 2, line 59, for "ar" read -- are --; column 9, line 44, for "if" read -- is --; column 14, line 24, Claim 13, for "sad" read -- said --.

Signed and sealed this 5th day of April 1960.

(SEAL)
Attest:

KARL H. AXLINE
Attesting Officer

ROBERT C. WATSON
Commissioner of Patents